Oct. 12, 1926.

H. P. CORBIN 1,603,027

IMPLEMENT HITCH

Filed April 14, 1924

Inventor:
Henry P. Corbin
by S.C. Shontz Atty.

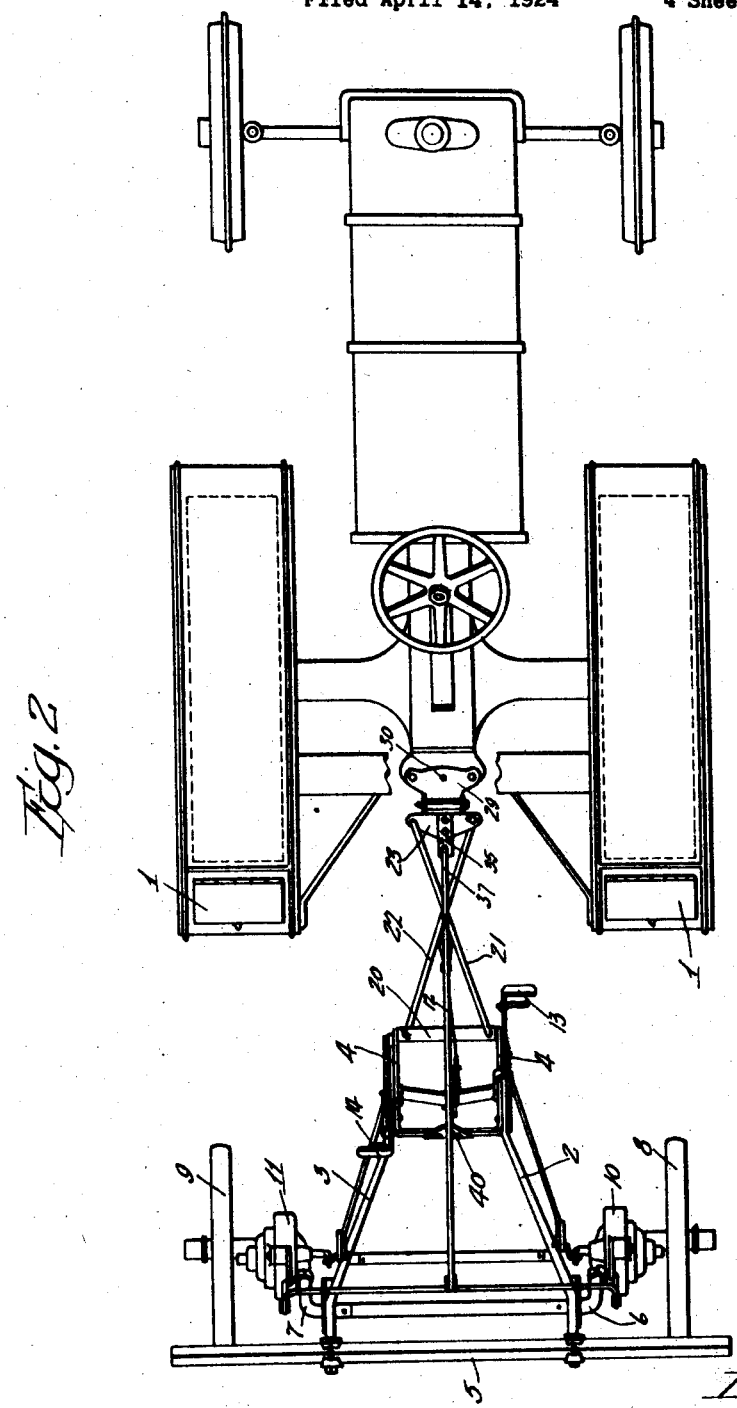

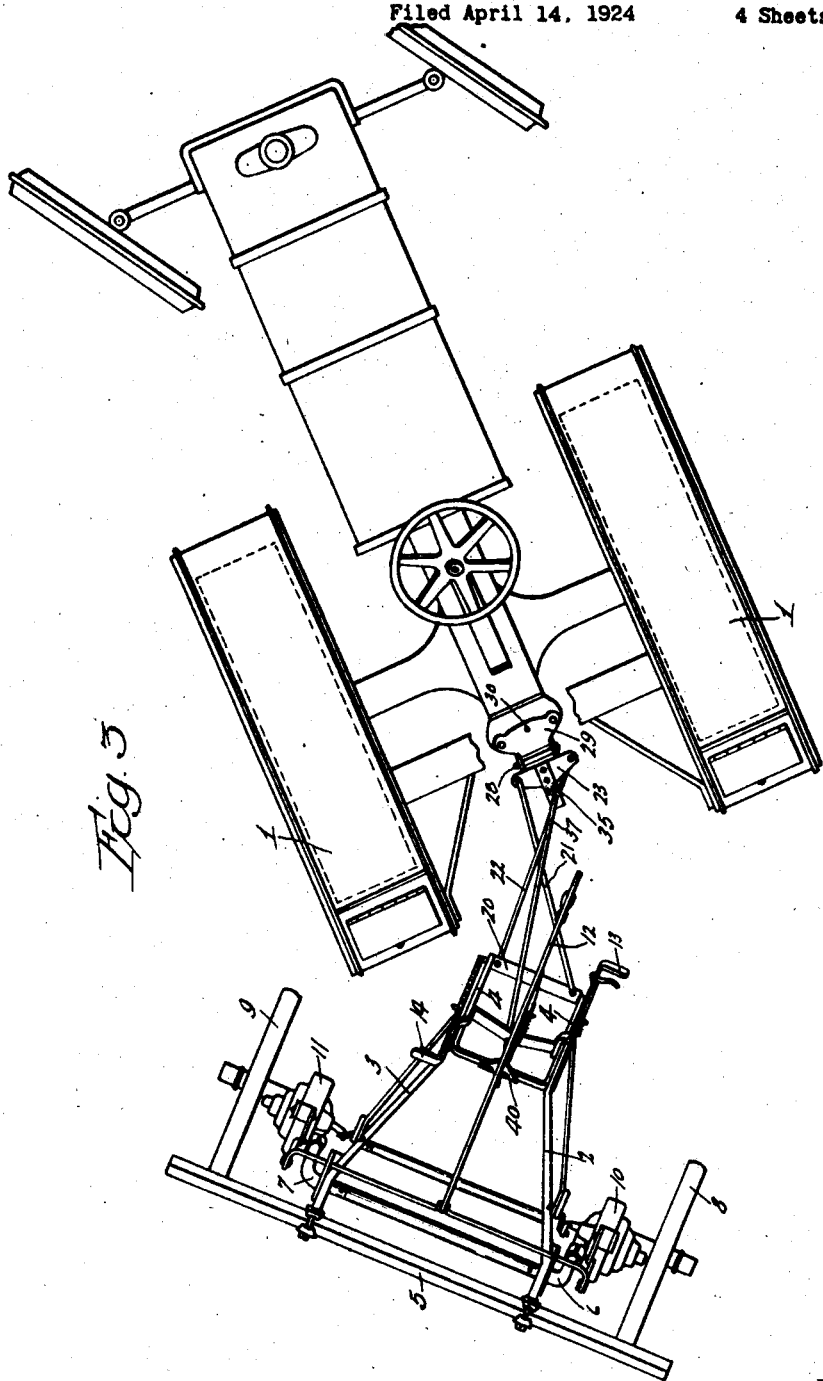

Oct. 12, 1926.
H. P. CORBIN
1,603,027
IMPLEMENT HITCH
Filed April 14, 1924
4 Sheets—Sheet 4
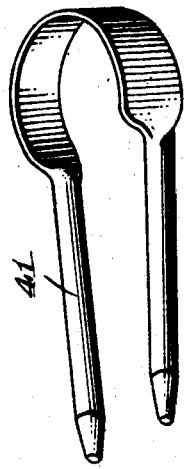
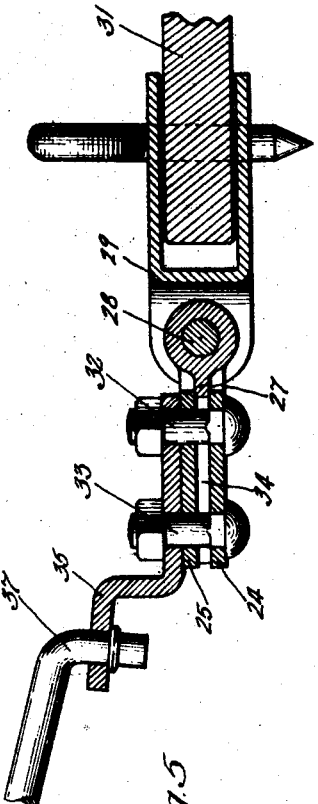
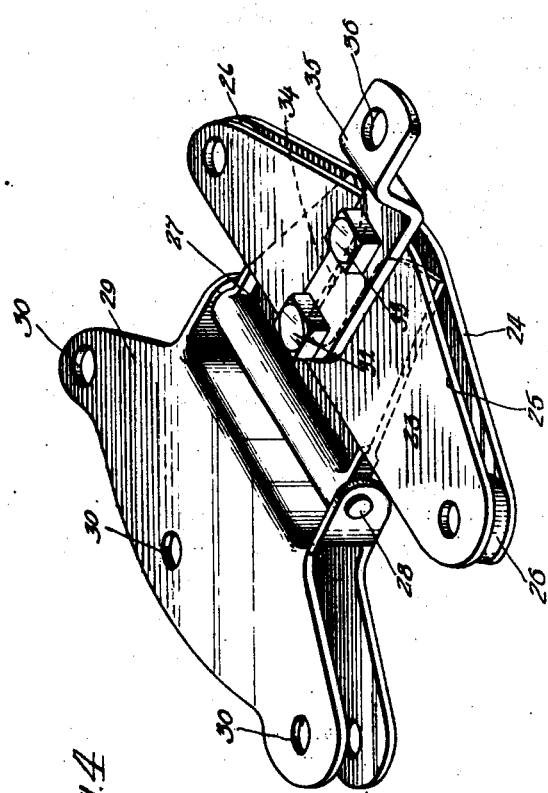
Inventor:
Henry P. Corbin
by L. C. Shonts Atty.

Patented Oct. 12, 1926.

1,603,027

UNITED STATES PATENT OFFICE.

HENRY P. CORBIN, OF MOLINE, ILLINOIS, ASSIGNOR, BY MESNE ASSIGNMENTS, TO MOLINE IMPLEMENT COMPANY, A CORPORATION OF ILLINOIS.

IMPLEMENT HITCH.

Application filed April 14, 1924. Serial No. 706,285.

The invention relates to implement hitches.

It relates particularly to a hitch for connecting an implement to a tractor so that when the tractor is turned sharply the implement and tractor will not interfere with one another.

When an implement is to be connected to a tractor, it is desirable to have the implement as close to the tractor as possible in order that the implement levers may be easily reached from the tractor and in order that the combined unit may be turned in a short radius at the ends of furrows or rows. This close coupling of the implement to the tractor can be accomplished by using a short hitch but difficulty is encountered, particularly with tractors having fenders, in that the draft connections strike the fenders so that there is not only interference in turning but the fenders are also damaged and the hitch may catch so as to require it to be disconnected before the tractor and implement can be properly straightened out. Most tractors have a draw bar extending behind the rear axle to which the implement hitch is connected. One proposal has been to lengthen this draw bar considerably so as to place the pivot point of the hitch farther to the rear. This would prevent the hitch from striking the sides of the tractor but, as the draw bar is lengthened, the implement has more of a leverage on the tractor which interferes with action of the front wheels in steering. If the pivotal connection between the hitch and the draw bar were directly under the rear axle, there would be substantially no resistance to turning the tractor, as far as the implement is concerned. This is due to the fact that the tractor turns about a vertical axis which is substantially in the plane of the rear axle. As the point of connection is moved farther to the rear, the draw bar forms a lever arm of length equal to the distance between the center of the rear axle and the point of connection of the hitch to the draw bar. When an effort is made to turn the tractor while it is going straight ahead, this lever arm must swing to the side and move the hitch with it. In the case of a plow, a heavy resistance is offered to such movement with the result that the front wheels of the tractor tend to skid and fail to turn the tractor. The result is that it is not practical to lengthen the draw bar in order to locate the hitch sufficiently to the rear to prevent interference with the fenders.

The present invention has been devised to overcome these difficulties by providing a hitch which can be connected relatively close to the rear axle of the tractor and one which at the same time will not interfere with the tractor fenders when the tractor is turned.

The general object of the invention is to provide an improved implement hitch.

A more specific object is to provide an implement hitch which will prevent a tractor and an implement hitched to it from interfering when the tractor is turned sharply in either direction.

Another object is to provide a hitch of this character which can be adjusted to make it either a rigid hitch or a hitch which is flexible when the immplement is lowered but which becomes rigid as the implement is raised.

Other objects and advantages of the invention will appear from the specification and drawings.

An embodiment of the invention is shown in the drawings, in which—

Figure 2 is a plan view of the implement hitched to a tractor with the tractor moving straight ahead.

Figure 3 is a plan view similar to Figure 2 showing the position of the implement and the tractor when the tractor is turned sharply to the left.

Figure 4 is a perspective of the front portion of the implement hitch.

Figure 5 is a cross section of the forward portion of the implement hitch.

Figure 6 is a perspective view of a clip, or stop member used in connection with the hitch.

Figure 1:
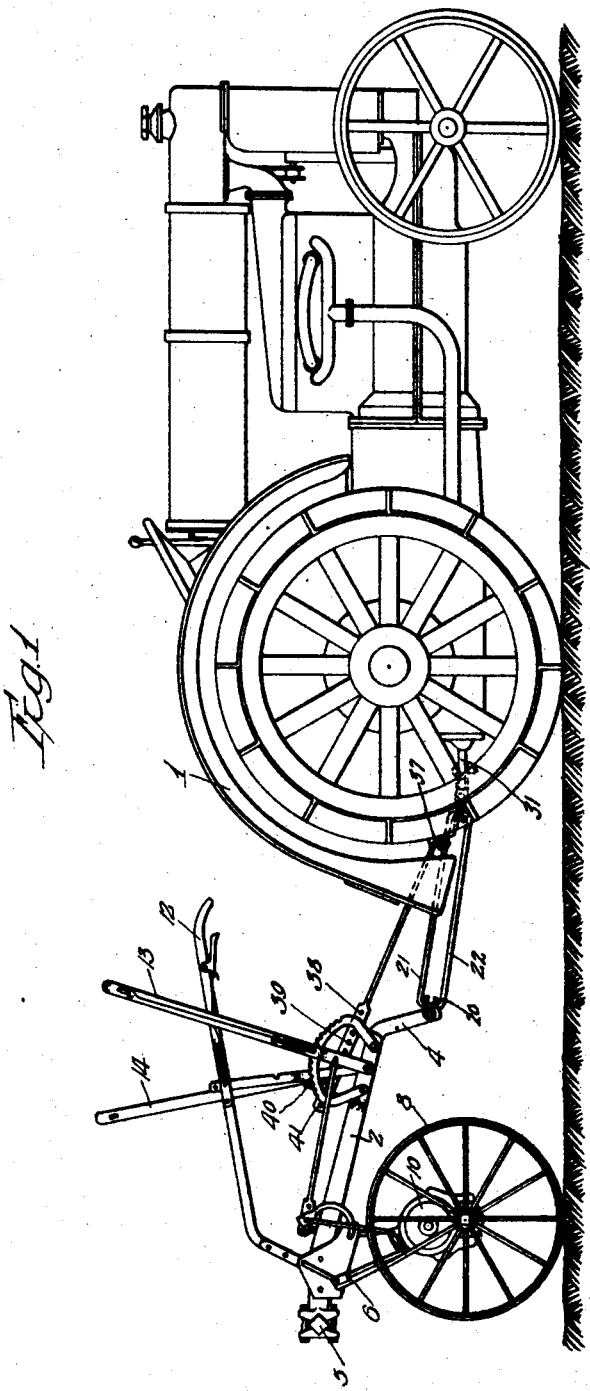
Figure 1 is a side elevation of an implement connected to a tractor by means of the improved hitch.

The tractor with which the hitch is illustrated is a Fordson tractor of the type having fenders 1 over the rear wheels.

The implement with which the hitch is illustrated is a universal carriage to which a wide variety of agricultural tools are connected. The carriage has a pair of draft bars 2 and 3, the front ends of which carry downwardly extending spaced members 4 to which the implement hitch is connected and the rear ends of which are connected to a tool bar 5. The draft bars are supported by a pair of independent crank axles 6 and 7 carrying ground wheels 8 and 9. These ground wheels operate powerlift mechanisms 10 and 11 which swing the crank axles to raise and lower the implement. The powerlift mechanisms are controlled by a common lever 12 which can be easily manipulated by an operator from his seat on the tractor. The two crank axles can be adjusted through the medium of levers 13 and 14 which are also positioned so that the operator can easily reach them from the tractor. The tools that are attached to the tool bar 5 may be one, two, three or more moldboard plows, or they may be heavy disk plow attachments. Other agricultural tools may also be employed. In the case of the plows, particularly, the resistance to turning is considerable and it is necessary to have the implement hitch or draft connection located in the proper manner. As previously explained, the connection must be relatively short and, when it is made of the required length, the fenders 1 interfere with turning under the conditions experienced with the ordinary hitch.

To avoid this difficulty, a hitch has been provided which permits a short connection between the tractors and the implement and at the same time holds the implement away from the tractor when the tractor is turned.

This hitch includes a member 20 pivoted near its ends to the downwardly extending projections 4 of the draft bars of the implement, the pivotal connection being such that the member can move about a horizontal axis. The connection is best illustrated in Figures 1 and 2.

Draft bars 21 and 22 are pivoted to the member 20 on vertical axes and in spaced relation, one being pivoted near one end of the member 20 and the other being pivoted near the other end. The bars are crossed as they extend forward and their other ends are pivoted on vertical axes and in spaced relation to a second member which will be designated generally as 23. The bar 21 is a plain round rod having its ends bent downwardly. The downwardly bent ends are inserted through holes in the members 20 and 23, the bar being held in place by cotter pins. The bar 22 is a plain metal rod with its ends bent upwardly. The upwardly bent ends extend through holes in the members 20 and 23, the bar being held in place by cotter pins. This construction is simple and it permits the bars to be crossed without interfering with one another. It will also be noted that the bars are interchangeable.

Member 23 is illustrated in detail in Figures 4 and 5. It comprises two plates 24 and 25 spaced apart by washers 26. Located between the plates is the tongue 27 which is pivoted at 28 to a clevis member 29 having holes 30 for connecting it to the draw bar 31 of a tractor. The two plates 24 and 25 are held together and they are clamped to the tongue 27 by means of bolts 32 and 33 which pass through holes in the plates 24 and 25 and through a slot 34 in the tongue 27. It will be observed that the tongue 27 can be pulled out of engagement with the plates 24 and 25 and there is thus provided a releasable hitch. The point at which the tongue will pull away from the plates depends upon how tight the bolts 32 and 33 are tightened. When the tongue has pulled away from the plates, it may be reconnected by loosening the bolts, re-inserting the tongue between the plates, and again tightening the bolts.

Bolts 32 and 33 also hold in position a third member 35 having a hole 36 for the reception of the bent end of a link 37. This link extends rearwardly and its rear end is provided with a flattened portion 38 having a series of holes 39. The flattened portion extends through a slot in a plate 40 connected to the implement, the slot being of such width that when the parts occupy the position illustrated in Figure 3 there will be no twisting strain upon the member 40. Co-operating with the rear end of this link is a U-shaped stop member or lock 41, illustrated in Fig. 6, made of a round metal rod so that it can be inserted through the holes 39 in the link 38. When the U-shaped member is placed in holes so that it is astride the plate 40, the link 39 is locked rigdly in position. This makes the implement hitch rigid in a vertical plane. When the member 41 is placed in holes to the rear of the plate 40 it will limit the forward movement of the link but it will allow the link to move rearwardly through the slot in plate 40. When the stop is in this position, the implement hitch is flexible when the implement is in operating position. For example, when the implement is lowered from the position of Figure 1, the link 38 moves rearwardly and the stop 41 is out of contact with the plate 40. The hitch can then adjust itself freely to the line of draft. When the implement is raised, the tendency is for the front end of the implement to raise first because of the heavy weight of the tools on its rear end. As the front end raises, the link 38 moves through the slot in plate 40 until stop 41 strikes plate 40 whereupon the link 38, combining with the bars 21 and 22, forms a brace that prevents further upward movement of the front end of the implement. The hitch thus limits the upward movemnt of the front end of the implement so that continued movement of the crank axles will raise the rear of the implement with the tools attached to it.

The hitch may be made entirely flexible if the stop member 41 is removed so that the bar 38 is free to move through the slot in the plate 40 at all times.

There has thus been provided a combination construction which will release when the draft exceeds a predetermined value; which will prevent interference of the tractor and implement; and which may be adjusted so that it becomes a rigid hitch or a flexible one that becomes rigid only when the implement is raised.

The combination of the link 38 with the other portions of the hitch is important because a much more desirable hitch is provided by the use of this link. The construction is such that the advantages of the link are obtained in a hitch which operates differently than the ordinary hitch in that it prevents interference of the tractor and implement.

It is to be understood that the construction shown is for purposes of illustration only and that variations may be made in it without departing from the spirit and scope of the invention as defined by the claims.

I claim:

1. A draft hitch for an implement that is capable of being raised and lowered, comprising a pair of cross links for connecting the implement to a tractor or the like so as to hold the implement in spaced relation to the tractor while the tractor is being turned to prevent interference of the implement and tractor, and means associated with the hitch and connected to the implement, adjustable to make the hitch a rigid one or to make it a flexible one when the implement is in operating position but a hitch that becomes rigid as the implement is raised.

2. An implement hitch having a pair of draft bars constructed so as to be connectible at one end on substantially vertical axes and in spaced relation to an implement of the type which may be tilted about its supporting wheels, said bars being crossed and constructed so as to be connectible at their other ends on substantially vertical axes and in spaced relation to a source of draft power such as a tractor or the like, and a bracing link connectible at one end to a tractor at a point adjacent to the connection of the draft bars and at its other end to an implement at a point in a horizontal plane sufficiently removed from the plane of the draft bars to cause the bracing link to form with them a bracing structure for holding the implement against tilting upwardly, one of the connections of said link being adjustable so that its effective length as a bracing means may be varied.

3. An implement hitch having a member adapted to be pivotally connected to an implement so as to be movable about a horizontal axis, a pair of draft bars connected to said member in spaced relation and on substantially vertical axis, said bars being crossed and connected at their other ends in spaced relation and on substantially vertical axes to a second member, said second member comprising two plates spaced apart, and a connecting device having a tongue releasably held between the plates by bolts which also hold the plates together, said connecting device serving to connect the second member to a source of draft power such as a tractor or the like.

4. A hitch for implements whose front ends tend to rise first when the implements are raised from working to transport position, comprising a member adapted to be pivoted to an implement to move about a horizontal axis, a pair of draft bars pivoted to said member in spaced relation and on substantially vertical axes, said bars being crossed and pivoted at their other ends in spaced relation and on substantially vertical axes to a second member adapted to be connected to a device to be drawn, and a link connected at one end to said second member and having its other end arranged for connection to an implement on a different horizontal plane than the connection of said first member to combine with the draft bars to form a brace to limit the upward movement of the front end of an implement as it is raised, one of the connections of said link being adjustable to vary the effective length of the link in its bracing action with the draft bars.

5. An implement hitch having a member adapted to be pivoted to an implement so as to be movable about a horizontal axis, a pair of draft bars pivoted to said member in spaced relation and on substantially vertical axes, said bars being crossed and being pivoted at their forward ends in spaced relation and on substantially vertical axes to a second member, a link pivoted to said second member, the opposite end of said link being adjustably connected to the implement on a different horizontal plane than the first member, and means for connecting said link to the implement so that it may be held rigidly in one position or may have a limited movement in one direction or the other.

6. An implement hitch having a member adapted to be pivoted to an implement so as to be movable about a horizontal axis, a pair of draft bars pivoted to the member in spaced relation and on substantially vertical axes, said draft bars being crossed and pivoted at their other ends in spaced relation and on substantially vertical axes to a second member comprising a pair of spacing plates, a releasable connecting device held between the spaced plates, a third member, means for fastening the third member to the second and for holding the plates of said second member in clamping relation on the connecting device, a link pivoted to the third member, and means for connecting the link to an implement on a different horizontal plane than the connection of the first member to the implement, said means being adjustable so that the effective length of the link may be varied.

In testimony whereof, I affix my signature.

HENRY P. CORBIN.